United States Patent [19]

Gross et al.

[11] Patent Number: 4,963,802

[45] Date of Patent: Oct. 16, 1990

[54] RESISTOR PROGRAMMABLE VELOCITY CONTROLLER

[75] Inventors: William H. Gross, Sunnyvale; James B. Cecil, Santa Clara, both of Calif.

[73] Assignee: ELANTEC, Milpitas, Calif.

[21] Appl. No.: 329,261

[22] Filed: Mar. 27, 1989

[51] Int. Cl.[5] ............................................. H02P 1/22
[52] U.S. Cl. ..................................... 318/294; 318/293; 318/663; 307/270
[58] Field of Search ............... 318/293, 294, 295, 567, 318/663, 670, 671, 674; 360/73.01, 73.02, 73.03, 73.04, 73.05, 73.06, 73.07, 73.08, 73.09, 73.11, 73.12, 73.13, 73.14; 307/257, 270

[56] References Cited

U.S. PATENT DOCUMENTS

| | | | |
|---|---|---|---|
| 3,229,181 | 1/1966 | Evans | 318/293 |
| 3,480,849 | 11/1969 | Thornsen et al. | 318/294 X |
| 3,924,171 | 12/1975 | Ukai et al. | 318/663 |
| 4,078,198 | 3/1978 | Murakosi et al. | 318/663 X |
| 4,379,985 | 4/1983 | Coppola | 318/293 |
| 4,447,768 | 5/1984 | Terui | 318/293 |
| 4,562,387 | 12/1985 | Lehnhoff | 318/294 X |
| 4,705,997 | 11/1987 | Juzswik | 318/293 X |
| 4,874,970 | 10/1989 | Coy et al. | 307/270 X |

Primary Examiner—Bentsu Ro
Attorney, Agent, or Firm—A. C. Smith

[57] ABSTRACT

A logic-controlled circuit superimposes a constant voltage across an actuator or motor load that is driven by a bridge-type amplifier to control the constant velocity operation of such load in response to an applied logic signal that may also disable the bridge-type amplifier.

4 Claims, 1 Drawing Sheet

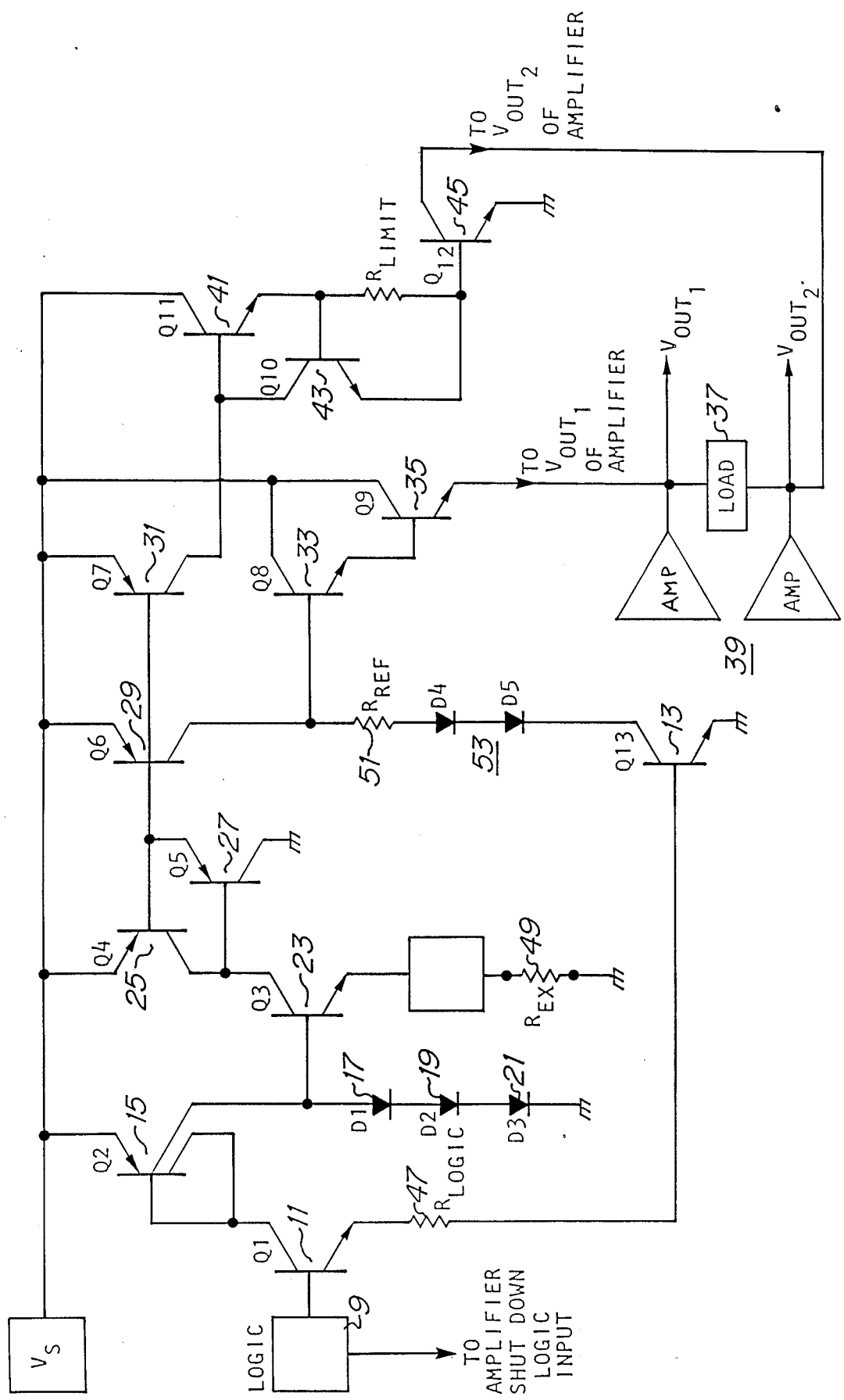

RESISTOR PROGRAMMABLE VELOCITY CONTROLLER

BACKGROUND OF THE INVENTION

Field of the Invention

This invention relates to control circuitry for the head-positioning motor of a disk drive assembly, and more particularly to a constant voltage control circuit which is programmable by external resistance values to provide logically-controlled constant velocity operation of the head-positioning motor of a disk drive assembly.

Conventional Winchester-type compact disk drives for magnetic memory media commonly use a voice-coil type of actuator or motor to position the magnetic transducer heads in a parked position remote from the magnetic recording surfaces of the disk. It is desirable to provide substantially constant velocity of movement of the head positioning mechanism to assure controlled impact of the mechanism into a mechanical bumper including a locking mechanism at the parked position.

SUMMARY OF THE INVENTION

In accordance with the present invention, constant velocity of movement is provided by a well-controlled constant voltage applied across the actuator or motor connected to a motor-driving amplifier. External resistor value determines the constant voltage forced to appear across the motor under control of the logic signals which indicate the requirement to move the transducer head to the parked position. The circuit remains inactive until the appearance of such logic signals.

DESCRIPTION OF THE DRAWING AND PREFERRED EMBODIMENT

The drawing is a schematic diagram of a circuit according to the present invention which is designed to be integrated in a single chip for convenient connection across the actuator or motor load of a bridge-type amplifier that can be disabled by a control signal. The circuit of the present invention remains disabled until activated by the logic signal that indicates the requirement for moving the transducer head to the parked position, and can be programmed to provide a selected constant voltage across the actuator or motor determined by the value of an external resistor.

Specifically, with reference to the drawing, when such logic signal (applied to input 9) is low, transistor 11 and transistor 13 are cut off. Transistor 15 therefore has no base current and the diodes 17, 19, and 21 have no forward conduction current, and transistor 23 thus has no base current. This causes the collector currents in transistors 23, 25, 27, 29 and 31 to be zero, and the base current of transistor 33 of the Darlington-coupled transistor pair 33, 35 to be zero. The emitter of the transistor 35 of the Darlington pair is connected to one terminal of the actuator or motor 37 and is free to change voltage level thereon as the bridge amplifier 39 supplies output signal to the associated terminal of the load 37. Also, since the collector current of transistor 31 is zero, the base currents in the transistor 41 is zero, and the base currents in the transistor 43 and 45 are therefore also zero. The collector of transistor 45, which is connected to the other terminal of the actuator or motor load 37, is therefore also free to change voltage level thereon as the bridge amplifier 39 supplies output signal to such terminal of the load 37. With the logic signal 9 low, the present circuit has no effect on the actuator or motor load 37.

However, in response to high level logic signal 9 applied to transistor 11, its base current increases and its emitter current increases to a value substantially determined by the voltage level of the logic signal 9 and the value of resistor 47 that connects the emitter of transistor 11 and the base of transistor 13. The transistor 13 therefore saturate and cause transistor 15 to conduct forward-biasing current through the diodes 17, 19 and 21 which, in turn, presents the substantially fixed voltage drop thereacross to the base of transistor 23. The external resistor 49 therefore determines the emitter current in transistor 23, and the transistors 25, 27, 29, and 31 are connected to mirror the current in the collector of transistor 23. This 'mirrored' current value therefore flows through transistor 29, and the reference resistor 51 and the diodes 53 and the saturated transistor 13.

The voltage drops across the saturated transistor 13, and across the forward-biased diodes 53, and across the reference resistor 51 are applied to the base of transistor 33 and appears (less the Vbe's of transistors 33 and 35) on the emitter of transistor 35 for application to one terminal of the load 37.

Similarly, the collector current of transistor 31 'mirrors' the current in transistor 23 which is applied to the ganged emitter followers 41 and 43 that provide adequate but limited base-drive current to saturate transistor 45 which has its collector electrode connected to the other terminal of load 37. The voltage drop across transistor 45 (while in saturation) is approximately equal to the saturation voltage drop across transistor 13. Therefore, the output voltage supplied across the load 37 is determined substantially by the current that is equal to the voltage drops across diodes 17, 19, and 21, less the Vbe of transistor 23, divided by the value of external resistor 49. The current that flows in the collector of transistor 23 is 'mirrored' to flow in the reference resistor 51 to produce the voltage drop thereacross (plus the forward voltage drops across diodes 53, less the comparable Vbe's of transistors 33 and 35) that appears across the load 37.

The internal integrated-circuit reference resistor 51 has a temperature coefficient of about +2200 PPM/°C. Since the forward voltage drops across the diodes 17, 19, 21 has a temperature coefficient of about −2000 PPM/°C., the resulting output voltage applied to the load 37 has a combined low temperature coefficient, and is readily determined substantially by the value of external resistor 49. Of course, the bias supply Vs may be different from the bias supply for the amplifier 39. The same logic signal 9 that is applied to the base of transistor 11 may be applied to the bridge-type amplifier 39 (for example, Model EL2020 or EL2007 commercially available from Elantec of Milpitas, Calif., or a double-ended differential amplifier) to disable the amplifier from attempting to drive the load 37 and the connected, active circuit of the present invention.

What is claimed is:

1. A circuit for supplying electrical signal to an actuator comprising:
   a first transistor including base, emitter and collector electrodes;
   a first plurality of diodes serially connected to the base electrode of the first transistor for supplying thereto forward conduction voltage drop thereacross;

input means for selectively supplying forward conduction current to said first plurality of diodes in response to a control signal applied thereto;

a first resistor connected to the emitter electrode of the first transistor for conducting current therethrough substantially proportional to the forward voltage drop across the first plurality of diodes and the resistance value of said first resistor;

means coupled to the collector electrode of the first transistor for sensing the current therein and for supplying a first current proportional to the current in the first resistor;

a second plurality of diodes and a second resistor connected to conduct said first current therethrough to produce a voltage drop thereacross;

first output means for supplying output current proportional to said voltage drop across said second plurality of diodes and said second resistor; and second output means for supplying output current proportional to the current in the first resistor.

2. The circuit according to claim 1 wherein the voltage drop across said second plurality of diodes varies with temperature at a rate that is opposite and approximately equal to the voltage drop across said second resistor.

3. The circuit according to claim 1 wherein said input means responds to applied control signal to supply current to said first plurality of diodes and to said second plurality of diodes.

4. The circuit according to claim 1 wherein said first and second output means are connected to the actuator for supplying thereto the voltage proportional to the voltage drop across said second plurality of diodes and said second resistor.

* * * * *